US012697920B2

(12) United States Patent
Ali et al.

(10) Patent No.: US 12,697,920 B2
(45) Date of Patent: Aug. 4, 2026

(54) RESONANT FREQUENCY BASED BELT TIGHTNESS/SLACK VERIFICATION DEVICE

(71) Applicant: GM Global Technology Operations LLC, Detroit, MI (US)

(72) Inventors: Kamran Ali, Troy, MI (US); Manuel Forero Rueda, Royal Oak, MI (US)

(73) Assignee: GM Global TEchnology Operations LLC, Detroit, MI (US)

( * ) Notice: Subject to any disclaimer, the term of this patent is extended or adjusted under 35 U.S.C. 154(b) by 3 days.

(21) Appl. No.: 18/668,146

(22) Filed: May 18, 2024

(65) Prior Publication Data

US 2025/0353432 A1    Nov. 20, 2025

(51) Int. Cl.
*B60Q 9/00* (2006.01)
*B60R 22/48* (2006.01)
(Continued)

(52) U.S. Cl.
CPC ............... *B60Q 9/00* (2013.01); *B60R 22/48* (2013.01); *G01L 5/04* (2013.01); *H01Q 1/3291* (2013.01); *B60R 2022/4841* (2013.01)

(58) Field of Classification Search
CPC ..... B60C 1/0016; B60C 11/00; B60C 11/243; B60C 2019/004; B60C 23/0428; B60C 23/064; B60C 5/14; B60C 23/0449; B60C 19/002; B60C 19/00; B60C 23/0493; B60C 23/068; B60C 11/24; B60C 2200/02; G01B 15/06; G01B 15/02;

G01B 7/24; G01B 15/00; G01M 17/02; G01M 5/0033; G01M 5/0091; G01M 17/027; G01M 5/008;
(Continued)

(56) References Cited

U.S. PATENT DOCUMENTS 5,093,929 A * 3/1992 Stolarczyk ............... H04B 5/28
                                                            455/100
7,714,737 B1 * 5/2010 Morningstar ........ B60N 2/2812
                                                            340/552
(Continued)

FOREIGN PATENT DOCUMENTS

DE    102004046305 A1    10/2005
DE    102007035233 A1     5/2008
DE    112022000797 T5    12/2023

*Primary Examiner* — Daniel Previl
(74) *Attorney, Agent, or Firm* — Honigman LLP; Matthew H. Szalach

(57) ABSTRACT

A system includes a belt that is adjustable between a secured state where there is at least a threshold level of tension across the belt, and an unsecured state where there is less than the threshold level of tension across the belt. The system also includes a first antenna, a second antenna, and an alert. The first antenna is disposed at the belt, operable to transmit and receive wireless communications, and operable at a resonant frequency with the belt in the secured state and inoperable at the resonant frequency with the belt in the unsecured state. The second antenna is disposed remote from the belt and operable to transmit and receive wireless communications at the resonant frequency. The alert is generated based on receiving a wireless communication from the first antenna at the second antenna when the resonant frequency is achieved, indicating the belt is in the secured state.

20 Claims, 5 Drawing Sheets

(51) Int. Cl.
 *G01L 5/04* (2006.01)
 *H01Q 1/32* (2006.01)

(58) Field of Classification Search
 CPC ......... G01M 1/22; H01Q 1/2241; H01Q 1/28; H01Q 1/3225; H01Q 15/0086; H01Q 7/00; H01Q 3/00; H01Q 13/20; H01Q 13/203; B64D 2045/0085; B64D 45/00; B64D 15/20; G01N 2027/222; G01N 27/02; G01N 27/026; G01N 27/221; G01N 27/4145; G01N 27/447; G01N 27/72; G01N 2291/014; G01N 29/036; G01N 33/0047; G01N 33/383; G01N 15/0606; G01N 15/0656; G01N 2015/0846; G01N 22/04; G01N 2291/02483; G01N 29/14; G01N 29/2481; G01N 22/00; G01N 33/0031; G01N 21/8851; G01N 2203/0021; G01N 2203/0023; G01N 2203/04; G01N 3/20; G01N 3/22; G02F 1/167; G06Q 30/018; G06Q 50/06; G06Q 50/08; G06Q 10/00; G06Q 20/00; G06Q 30/00; G06Q 40/00; G06Q 50/00; G06Q 90/00; G06Q 99/00; G06Q 2220/00; G06Q 2230/00; G06Q 2240/00; G06Q 2250/00; H04L 63/1416; H04L 9/3247; H04L 67/10; H04L 67/131; H04L 67/12; B64C 25/36; B64F 5/60; B64U 70/95; G01L 1/25; G01L 5/0052; G01L 5/10; G01L 5/226; C08K 3/042; C08K 3/045; C08K 9/02; C08K 3/04; C08K 7/06; G06K 19/0672; G06K 19/07764; G06K 19/0707; G06K 7/0095; G06K 7/10168; G06K 7/10217; G06K 7/10366; G06K 7/10465; H04W 4/80; H04W 4/38; H04W 12/06; H04W 4/027; H04W 4/12; H04W 52/0254; H04W 84/18; H04W 88/02; H04W 88/06; G06F 3/017; G06F 1/163; G06F 3/00; G06F 3/011; G06F 16/5866; G06F 18/22; G06F 11/00; G06F 16/53; G06F 3/002; G06V 40/23; G06V 10/143; G06V 10/44; G06V 10/462; G06V 10/48; G06V 10/753; G06V 20/58; G06V 30/142; G06V 40/113; G06V 40/28; G06V 10/761; G06V 2201/06; G06V 40/165; G06V 40/18; G06V 2201/08; G16H 50/20; G16H 20/30; G16H 40/63; G16H 40/67; A42B 3/0433; A42B 3/046; A61B 5/11; A61B 5/1116; A61B 5/1118; A61B 5/1128; A61B 5/163; A61B 5/165; A61B 5/18; A61B 5/6804; A61B 5/681; A61B 5/6826; A61B 5/6893; A61B 5/0031; A63B 2071/1233; A63B 2071/125; A63B 2071/1283; A63B 21/072; A63B 21/0724; A63B 21/0726; A63B 2220/12; A63B 2220/13; A63B 2220/16; A63B 2220/20; A63B 2220/24; A63B 2220/30; A63B 2220/40; A63B 2220/51; A63B 2220/53; A63B 2220/56; A63B 2220/72; A63B 2220/74; A63B 2220/75; A63B 2220/76; A63B 2220/803; A63B 2220/806; A63B 2220/807; A63B 2220/833; A63B 2220/836; A63B 2225/30; A63B 2225/50; A63B 2225/54; A63B 2225/74; A63B 2230/06; A63B 2230/60; A63B 2230/70; A63B 2243/0025; A63B 2243/0037; A63B 2243/0054; A63B 2243/0066; A63B 2243/007; A63B 2243/0095; A63B 2244/102; A63B 2244/18; A63B 2244/19; A63B 2244/20; A63B 2244/203; A63B 43/004; A63B 60/46; A63B 69/0002; A63B 69/0026; A63B 69/0028; A63B 69/0048; A63B 69/0071; A63B 69/02; A63B 69/06; A63B 69/16; A63B 69/36; A63B 69/3632; A63B 69/38; A63B 71/06; A63B 71/085; A63B 71/10; A63B 71/1216; A63B 71/1291; A63B 71/141; A63B 71/145; A63B 2071/0694; A63B 2220/54; A63B 2220/64; A63B 53/10; A63B 53/12; A63B 60/42; A63B 71/0622; B33Y 10/00; B60J 1/20; G09B 19/0038; H04B 1/04; H04M 1/72454; H04M 23/57; H04M 7/18; G06N 20/00; G06N 20/10; G06N 20/20; G06N 3/045; G06N 3/0464; G06N 3/088; G06N 3/09; G06N 5/025; G06N 5/046; G06N 7/01; F16D 2066/005; F16D 66/027; G06T 19/003; G06T 19/066; G06T 2207/20212; G06T 2207/30184; G06T 3/4038; G06T 7/0002; G06T 2207/30132; G06T 7/001; G06T 7/60; G06T 7/74; A61D 17/002; A01K 11/008; A01K 29/005; Y02D 30/70; E02D 2600/20; E02D 29/02; E02D 29/0208; E02D 29/025; E02D 29/0266; E02D 3/10; E04B 2/02; E04B 2002/0202; E04B 2002/0245; E04B 2002/0247; E04B 1/00; E04B 2/00; E04B 5/00; E04B 7/00; E04B 9/00; E04B 2103/00; E04C 1/39; E01D 1/00; E01D 2/00; E01D 4/00; E01D 6/00; E01D 11/00; E01D 12/00; E01D 15/00; E01D 18/00; E01D 19/00; E01D 21/00; E01D 22/00; E01D 210/00; G02B 6/30; G02B 6/3636; G02B 6/3652; G02B 6/3692; G02B 6/4202; G02B 6/4214; G02B 6/4225; G02B 6/4226; G02B 6/4239; G02B 6/4243; G05D 1/101; G05D 1/0061; G05D 1/81; B07C 1/04; B25J 13/08; B25J 9/1687; B60G 17/016; B60K 1/00; B60K 17/358; B60P 1/006; B60P 1/36; B60W 2420/403; B60W 2554/802; B60W 2710/0605; B60W 2710/18; B60W 30/085; B60W 30/09; B60W 30/0956; B60W 30/16; B60W 30/12; B62D 21/14; B62D 57/024; B62D 61/12; B62D 63/02; B62D 15/0265; B65H 1/04; B65H 1/06; B65H 2220/01; B65H 2220/04; B65H 2404/65; B65H 2405/11151; B65H 2405/114; B65H 2405/322; B65H 2511/12; B65H 2511/22; B65H 2701/1916; B65H 2801/06; B65H 3/523; B65H 31/10; B65H 43/00; B65H 7/20; G01C 21/20; G03B 21/001; G03B 19/026; G03B 27/6242; G03G 15/6552; G03G 21/1604; G03G 15/605; G07B 17/00467; G07B 2017/00241; G07B 2017/00491; G08G 5/34; G08G 5/50; G08G 5/55; A01D 34/18; A01D 45/22; A01D 1/00; A01D 3/00; A01D 5/00; C08J 5/042; B65G 47/82; B65G 47/905; B65G 59/04; B65G 61/00; G01P 3/04; F41G 5/14; F02M
19/088; F02M 7/00; H01R 13/5216;
H01R 13/7193; H01R 13/7197; G07C
13/00; G07C 1/00; G07C 3/00; G07C
5/00; G07C 7/00; G07C 9/00; G07C
11/00; G07C 15/00; G07C 2205/00;
G07C 2209/00

USPC .......... 340/457.1, 457.2, 464, 469, 488, 511,
340/539.1, 539.11, 539.21, 539.22,
340/539.32, 571, 572.7, 576

See application file for complete search history.

(56) References Cited

U.S. PATENT DOCUMENTS

| | | | | |
|---|---|---|---|---|
| 8,063,788 | B1 * | 11/2011 | Morningstar ............ | B60N 2/28 |
| | | | | 340/439 |
| 2014/0128032 | A1 * | 5/2014 | Muthukumar .... | H04W 52/0254 |
| | | | | 455/412.2 |
| 2022/0371506 | A1 * | 11/2022 | Schultz ............. | H04M 1/72415 |
| 2023/0021276 | A1 * | 1/2023 | Stowell ................. | B60C 1/0016 |
| 2023/0384264 | A1 * | 11/2023 | Jardine .................. | B64D 45/00 |
| 2024/0272103 | A1 * | 8/2024 | Cook ................... | G06Q 30/018 |
| 2024/0288381 | A1 * | 8/2024 | Stowell ................. | H01Q 13/20 |

* cited by examiner

FIG. 3
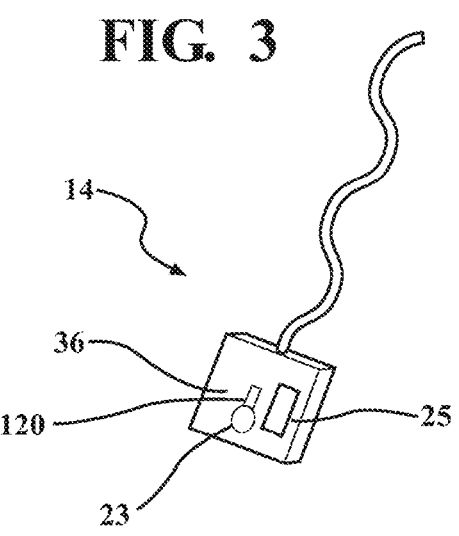
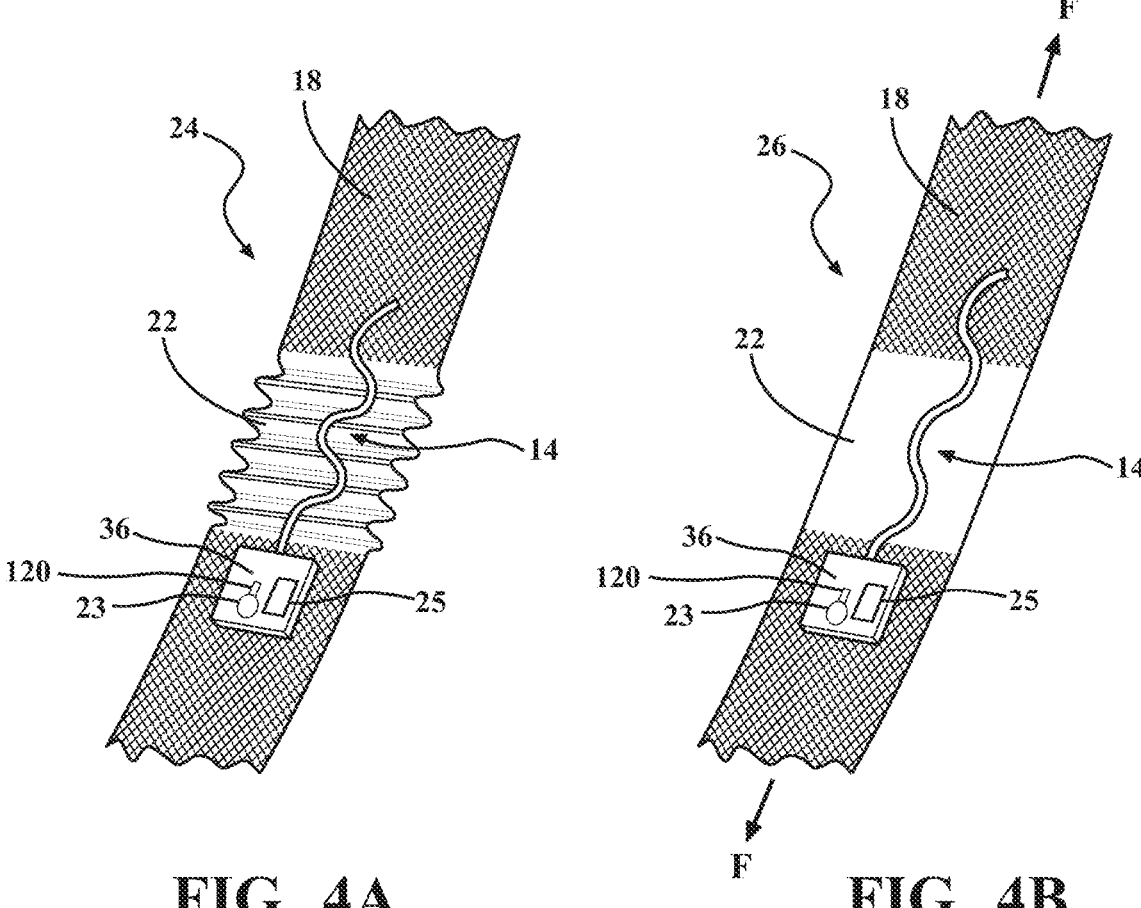
FIG. 4A                 FIG. 4B

RESONANT FREQUENCY BASED BELT TIGHTNESS/SLACK VERIFICATION DEVICE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to belts, such as seatbelts in a vehicle, straps for securing cargo, and safety harnesses like those used in rock climbing. In many circumstances, the proper and sufficient tightening of belts needs to be verified and monitored. For example, during the transportation of cargo that is secured using one or multiple belts or harnesses, or when a child is secured in a car seat using safety belts, the proper tightness of the belts is crucial to ensure they function in the most effective manner. That is, the effectiveness of the belt is reliant on the belt being tightly secured to the cargo or a user wearing the belt. However, it is typically difficult to determine whether the belt is properly tightened when initially installed, leaving the user to guess that the tension applied to the belt is sufficient. Furthermore, throughout the duration of using the belt, the user is traditionally unaware if a belt has inadvertently loosened to a point where it is no longer functioning properly. Alternatively, conventional methods make it difficult for a user to ascertain if a belt is too tight for its application.

SUMMARY

One aspect of the disclosure provides a system. The system includes a belt, a first antenna, a second antenna, and a processor configured to issue an alert. The belt is adjustable between a secured state where there is at least a threshold level of tension across the belt, and an unsecured state where there is less than the threshold level of tension across the belt. The first antenna is disposed at the belt and operable to transmit and receive wireless communications, the first antenna operable at a resonant frequency with the belt in the secured state and inoperable at the resonant frequency with the belt in the unsecured state. The second antenna is disposed remote from the belt, the second antenna operable to transmit and receive wireless communications at the resonant frequency. The alert is generated based on receiving a wireless communication from the first antenna at the second antenna, the wireless communication transmitted from the first antenna at the resonant frequency and indicative of the belt being adjusted to the secured state.

Implementations of the disclosure may include one or more of the following optional features. In some examples, the first antenna includes a meander dipole antenna. In some further examples, as the belt is adjusted from the unsecured state to the secured state, the meander dipole antenna stretches to become operable at the resonant frequency.

In some implementations, the system further includes an energy harvester disposed at the belt, the energy harvester generating electrical power based on wireless communications received at the first antenna at the resonant frequency. The generated electrical power electrically powers transmission of the wireless communication signal from the first antenna. In some further implementations, the generated electrical power electrically powers a sensor disposed at the belt. In some even further implementations, the sensor includes a tension sensor that generates sensor data representative of tension across the belt.

In some aspects, the system further includes a power source disposed at the belt, the power source electrically powering the first antenna.

In some examples, the belt includes a seatbelt of a vehicle. In some further examples, a power source of the vehicle electrically powers the first antenna.

In some implementations, the generated alert includes at least one of the group consisting of (i) an audible alert, (ii) a visual alert, and (iii) a haptic alert.

Another aspect of the disclosure provides a verification system. The verification system includes a belt including a buckle, a first antenna, a second antenna, and a processor configured to issue an alert. The belt is adjustable between a secured state where the buckle is received by a receiver and there is at least a threshold level of tension across the belt, and an unsecured state where there is less than the threshold level of tension across the belt. The first antenna is disposed at the belt and operable to transmit and receive wireless communications, the first antenna operable at a resonant frequency with the belt in the secured state and inoperable at the resonant frequency with the belt in the unsecured state. The second antenna is disposed remote from the belt, the second antenna operable to transmit and receive wireless communications at the resonant frequency. The alert is generated based on receiving a wireless communication from the first antenna at the second antenna, the wireless communication transmitted from the first antenna at the resonant frequency and indicative of the belt being adjusted to the secured state.

Implementations of this aspect of the disclosure may include one or more of the following optional features. In some examples, the first antenna includes a meander dipole antenna. In some further examples, as the belt is adjusted from the unsecured state to the secured state, the meander dipole antenna stretches to become operable at the resonant frequency.

In some implementations, the verification system further includes an energy harvester disposed at the belt, the energy harvester generating electrical power based on wireless communications received at the first antenna at the resonant frequency, and the generated electrical power electrically powering transmission of the wireless communication signal from the first antenna.

In some aspects, the verification further includes a power source disposed at the belt, the power source electrically powering the first antenna.

In some examples, the generated alert includes at least one of the group consisting of (i) an audible alert, (ii) a visual alert, and (iii) a haptic alert.

Yet another aspect of the disclosure provides a vehicle. The vehicles includes a belt including a buckle, a first antenna, a second antenna, and a processor configured to issue an alert. The belt is adjustable between a secured state where the buckle is received by a receiver and there is at least a threshold level of tension across the belt, and an unsecured state where there is less than the threshold level of tension across the belt. The first antenna is disposed at the belt and operable to transmit and receive wireless communications, the first antenna operable at a resonant frequency with the belt in the secured state and not operable at the resonant frequency with the belt in the unsecured state. The second antenna is disposed remote from the belt, the second antenna operable to transmit and receive wireless communications at the resonant frequency. The alert is generated based on receiving a wireless communication from the first antenna at the second antenna, the wireless communication transmitted from the first antenna at the resonant frequency and indicative of the belt being adjusted to the secured state.

Implementations of this aspect of the disclosure may include one or more of the following optional features. In some examples, the first antenna includes a meander dipole antenna. In some further examples, as the belt is adjusted from the unsecured state to the secured state, the meander dipole antenna stretches to become operable at the resonant frequency.

In some implementations, the vehicle further includes an energy harvester disposed at the belt, the energy harvester generating electrical power based on wireless communications received at the first antenna at the resonant frequency, and the generated electrical power electrically powering transmission of the wireless communication signal from the first antenna.

BRIEF DESCRIPTION OF THE DRAWINGS

The drawings described herein are for illustrative purposes only of selected configurations and are not intended to limit the scope of the present disclosure.

FIG. 3 is a perspective view of a first antenna of a belt-tightness verification system of the vehicle.

FIG. 4A is a perspective view of a belt in an unsecured or slack state with the first antenna disposed at the belt.

FIG. 4B is a perspective view of the belt in a secured or tensioned state.

Corresponding reference numerals indicate corresponding parts throughout the drawings.

DETAILED DESCRIPTION

Figure 1:
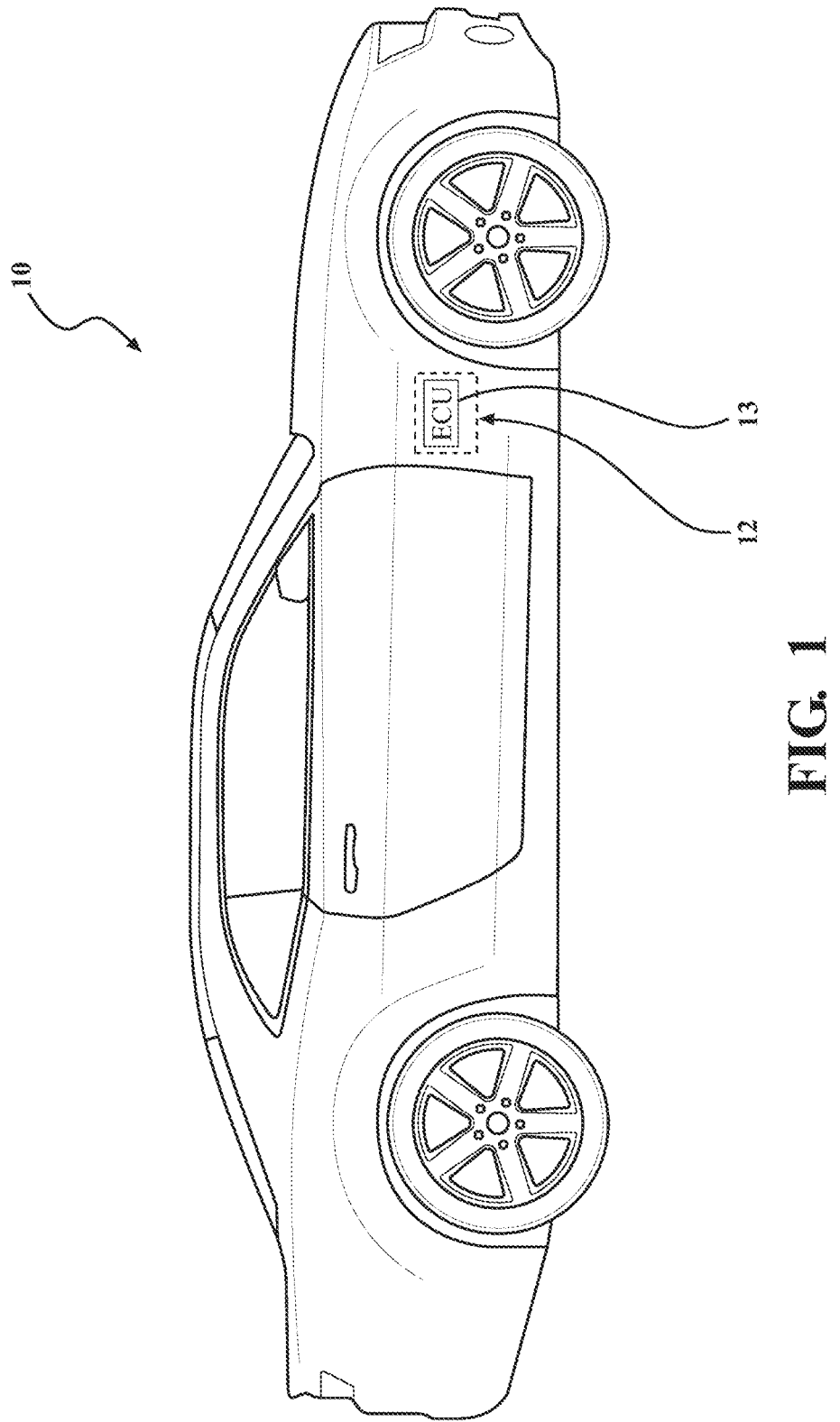
FIG. 1 is a side-view of a vehicle.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A belt-tightness verification system incorporates two antennas that wirelessly communicate with one another to provide feedback to a user related to the tightness of a belt. A first antenna that is attached to the belt is of the meander dipole variety and thus a resonant frequency of the antenna varies based on the amount of stretch experienced by the antenna. That is, the frequency at which the antenna transmits and receives wireless communication signals changes as the antenna stretches. The antenna stretches as tension is applied across the belt. A second antenna is disposed remote from the belt and operates to transmit and receive wireless communication signals at a preset frequency. When the first antenna and the second antenna operate at or near the same frequency, communication between the two antennas can occur. The first antenna and the second antenna are configured to be in wireless communication with one another when a threshold level of tension is present across the belt that causes the first antenna to stretch to a point that it is operating at a frequency at or near the frequency of the second antenna. Based on communications between the first antenna and the second antenna, an alert is generated, providing the user with audible feedback, visual feedback, and/or haptic feedback to notify the user of sufficient tightness of the belt. If the two antennas are not operating at or near the same frequency, there will be no communication between the two antennas, indicating that the belt is not properly tightened.

With reference to FIG. 1, a vehicle 10 includes a belt-tightness verification system 12 associated with one or multiple seatbelts of the vehicle 10. The system 12 is accommodated by an electronic control module or ECU 13 at the vehicle 10, the ECU 13 having electronic circuitry and associated software for operating the system 12. Although described herein as incorporated into seatbelts of the vehicle 10, it should be understood that characteristics of the belt-tightness verification system 12 may be suitable for use with other belts or straps of the vehicle 10, such as a belt of a child's car seat, a belt used to strap cargo that is transported by the vehicle 10, and the like. Furthermore, characteristics of the belt-tightness verification system 12 may be suitable for use with non-vehicular applications, such as safety harnesses used by individuals during rock climbing, construction work, and the like.

Figure 2:
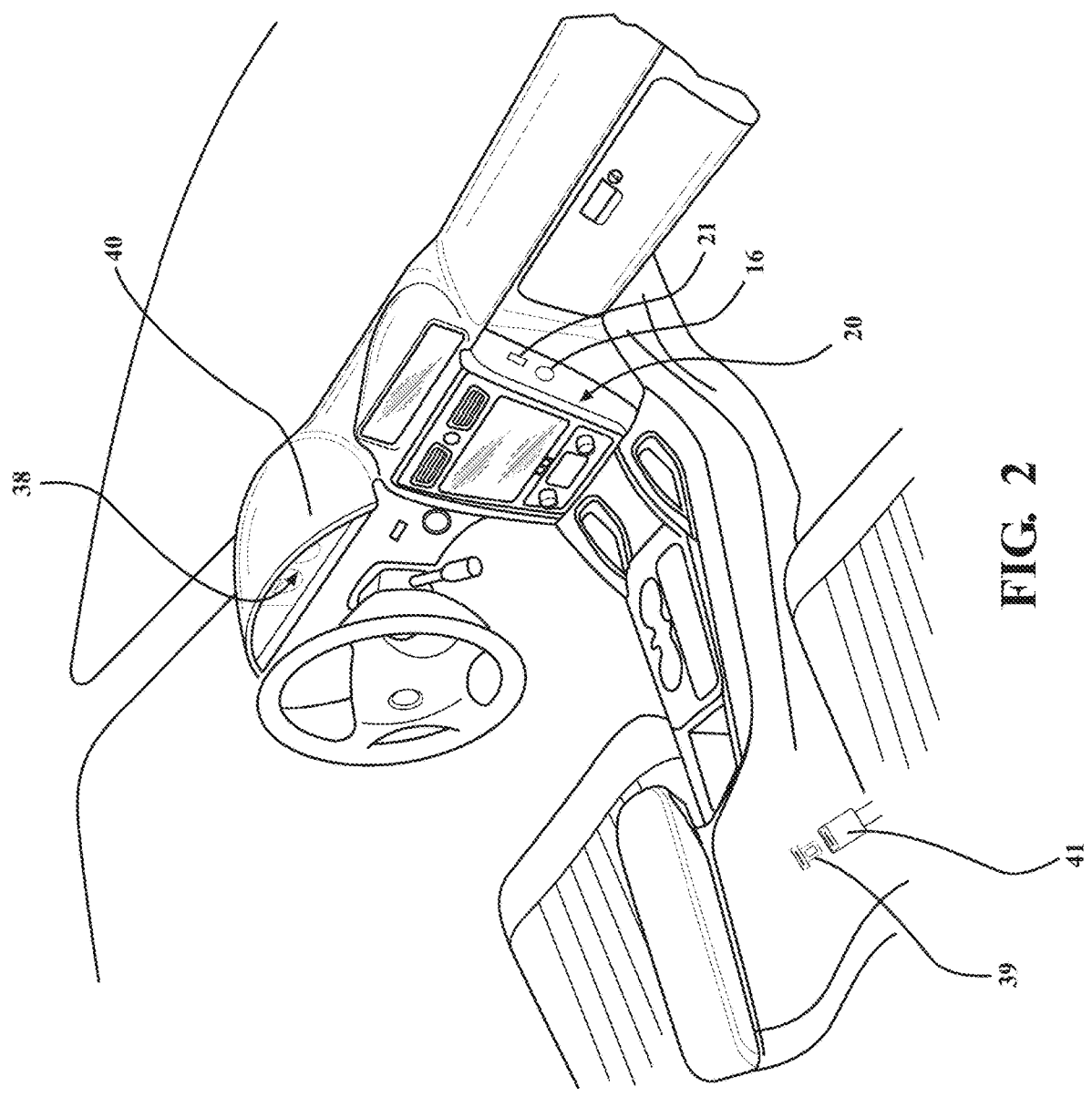
FIG. 2 is a perspective view of an interior of the vehicle of FIG. 1.

With continued reference to FIG. 1 and also with reference to FIGS. 2-4B, the system 12 includes a first antenna 14 and a second antenna 16. The first antenna 14 is disposed at a belt 18 of the vehicle 10 (e.g., a seatbelt) and the second antenna 16 is disposed remote from the belt 18, such as within a center-stack 20 or at a dashboard of the vehicle 10. While FIG. 2 shows the second antenna 16 disposed at the center-stack 20 of the vehicle 10, the second antenna 16 may be disposed at any suitable location within the vehicle 10 that allows for wireless communication between the second antenna 16 and the first antenna 14, such as a headrest of a seat, a B-pillar, an overhead console module, and the like. The second antenna 16 may receive electrical power from a power source 21 of the vehicle 10, such as via wired connection to a wire harness of the vehicle 10. As discussed further below, the belt 18 is adjustable between an unsecured state 24, where no or limited tension is present across the belt 18 (such as when a buckle of the seatbelt is not received at a receiver and the seatbelt is not secured about the user), and a secured state 26, where at least a threshold level of tension is present across the belt 18 (such as when the buckle of the seatbelt is received at the receiver and the seatbelt is secured about the user). Wireless communications are transmitted between the first antenna 14 and the second antenna 16 for determining that the belt 18 is in the secured state. If the system 12 is utilized at a location outside the context of a vehicle, such as incorporated into a harness used by an individual, the second antenna 16 may be powered by a battery pack that is included in the system 12.

Power provided to the first antenna 14 may be accomplished in a variety of ways. The methods of power also vary based on the method of communication that occurs between the first antenna 14 and the second antenna 16. For example, wireless communication 23 between the first antenna 14 and the second antenna 16 may be accomplished via BLUETOOTH™. In this example, the first antenna 14 draws electrical power from a power source, such as a battery 25, disposed on the first antenna 14 or disposed at or near the belt 18 at which the first antenna 14 is disposed. Optionally, the first antenna 14 receives electrical power from the power source of the vehicle 10, such as via electrical connection to the wire harness of the vehicle 10.

In some examples, wireless communication between the first antenna 14 and the second antenna 16 is accomplished via radio frequency identification (RFID) and, thus, the first antenna 14 may draw power from the battery 25 at the belt 18 and/or the power source of the vehicle 10. Further, RFID communication may enable the first antenna 14 to receive power from an energy harvesting mechanism 120, such as due to the lower power consumption for transmitting and receiving RFID signals. For example, a solar panel disposed at the belt 18 may generate electrical power for powering the first antenna 14. Moreover, the energy harvesting mechanism 120 may generate power by harvesting energy created by movement, such as when the belt 18 is moved from the unsecured state to the secured state.

Optionally, energy may be generated based on RFID signals received at the first antenna 14. Because transmission of wireless communication signals occurs between the first antenna 14 and the second antenna 16 when the resonant frequencies of the first antenna 14 and the second antenna 16 are equivalent, the first antenna 14 may receive signals from the second antenna 16 for generating power when both antennas experience matching frequencies. In other words, the energy harvesting mechanism 120 is disposed at the belt 18 and generates electrical power based on wireless communications received at the first antenna 14. The generated electrical power may then electrically power transmission of the wireless communication signal from the first antenna 14.

The first antenna 14 may be of the meander dipole variety, in which the resonant frequency of the first antenna 14 varies based on the amount of stretch experienced by the first antenna 14. That is, the first antenna 14 receives and transmits wireless communications at different resonant frequencies based on its current length. Because the first antenna 14 is installed on the belt 18, the operating frequency of the first antenna 14 differs depending on the level of tension experienced by the belt 18. To translate tension across the belt 18 into stretch of the first antenna 14, the belt 18 may include a tension-reactive portion 22 that endures a physical change in the form of stretching, twisting, unfolding, or any manner of changing shape based on the tightness of the belt 18. The first antenna 14 is disposed at the tension-reactive portion 22 of the belt 18 to facilitate stretching and contracting of the first antenna 14, which ultimately allows the first antenna 14 to reach a shape that enables communication transmission. It is important to note that the tension-reactive portion 22 may form a portion of the belt 18, or may be attached to the belt 18 in parallel. In FIG. 4A, the belt 18 is in the unsecured state 24, meaning the belt 18 is experiencing little to no tension, such as when the buckle of the seatbelt is released from its receiver. In the unsecured state 24, both the tension-reactive portion 22 of the belt 18 and the first antenna 14 are in a state of contraction. When force is applied to the belt 18 in a matter that increases its tension, the belt will exist in the secured state 26 (FIG. 4B), such as when the buckle of the seatbelt of the vehicle 10 is securely retained in its receiver. In the secured state, an increased amount of tension experienced by the belt 18 allows the tension-reactive portion 22 to stretch. Because of the placement of the first antenna 14 at the tension-reactive portion 22 of the belt 18, the secured state 26 of the belt 18 allows the first antenna 14 to stretch in tandem with the tension-reactive portion 22.

The first antenna 14 may be attached and secured to the belt 18 in a variety of ways. When the first antenna 14 is of the meander dipole variety, the first antenna 14 may be mounted to the belt 18 at the tension-reactive portion 22 using an adhesive. In some examples, the first antenna 14 may be stitched to the belt 18 at the tension-reactive portion 22. Optionally, a tension sensor 36 may be disposed at the belt 18 for measuring the tension of the belt 18 such that the first antenna 14 may be digitized and stitched on top, or within, the belt 18 at any suitable location.

Figure 5A:
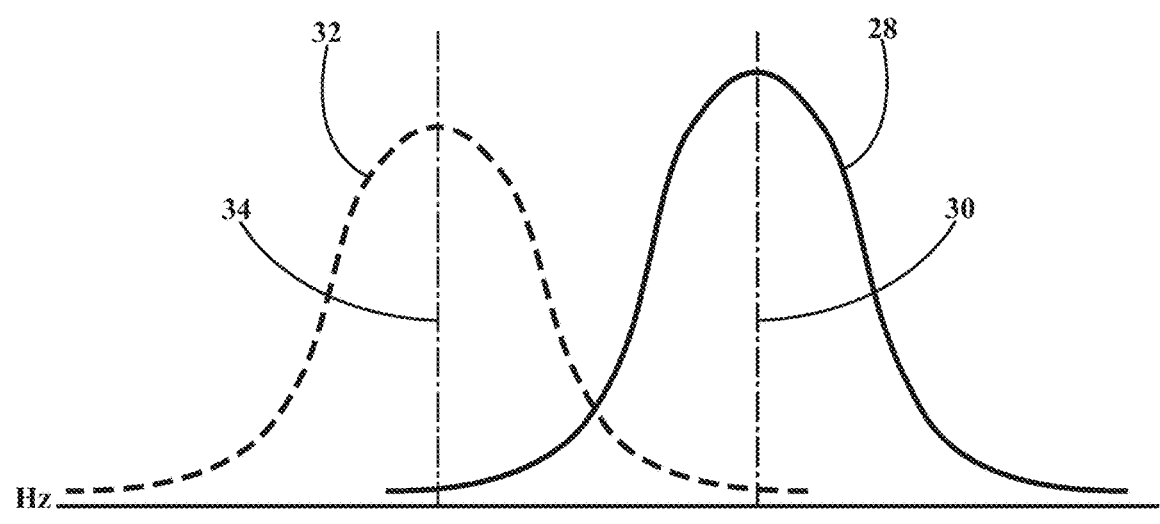
FIG. 5A is a graphical representation of the first antenna operating at a different resonant frequency than a second antenna when the belt is in the unsecured state.
Figure 5B:
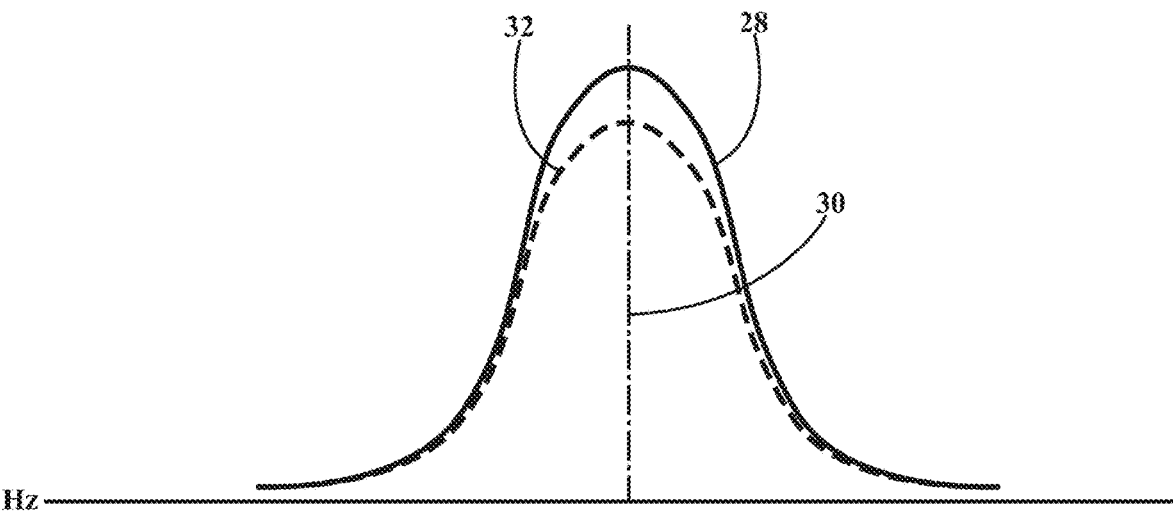
FIG. 5B is a graphical representation of the first antenna operating at the same resonant frequency as the second antenna when the belt is in the secured state.

With continued reference to FIGS. 1-4B, and also with reference to FIGS. 5A and 5B, the second antenna 16 may operate at a second antenna frequency 28 being a constant and unchanging first frequency 30. That is, the second antenna 16 is operable to transmit and receive wireless communications at the first frequency 30. The first frequency 30 may be calibrated by a user of the system 12, or may be calibrated prior to installation of the second antenna 16 in the vehicle 10. When the belt 18 is in the unsecured state 24, a first antenna frequency 32 is at a second frequency 34 that is not equivalent to the first frequency 30. In other words, the first antenna 14 operates at the second frequency 34 with the belt 18 in the unsecured state 24 and does not operate at the first frequency 30 with the belt 18 in the unsecured state 24. This situation is due to the first antenna 14 being in a state of contraction in tandem with the tension-reactive portion 22 of the belt 18. Furthermore, if the first antenna 14 is powered based on receiving RFID communications from the second antenna 16, the first antenna 14 will not receive any power because the first antenna 14 and the second antenna 16 are operating at different frequencies in the unsecured state 24. The second antenna 16 will only be able to communicate with the first antenna 14 when the first antenna 14 is at the first frequency 30, meaning communication does not occur between the first antenna 14 and the second antenna 16 when the belt 18 is in the unsecured state 24. However, when the belt 18 is in the secured state 26 due to a threshold level of tension experienced by the belt, the tension-reactive portion 22 of the belt 18 will stretch, forcing the first antenna 14 to stretch in tandem. Being of the meander dipole variety, the stretching of the first antenna 14 will adjust its communication frequency, and with the belt 18 in the secured state 26, the first antenna frequency 32 will now exist at the first frequency 30. That is, the first antenna 14 operates at the first frequency 30 with the belt 18 in the secured state 26. At this point, the first antenna frequency 32 will match the second antenna frequency 28 at the first frequency 30, which allows for communication between the first antenna 14 and the second antenna 16. Additionally, power can be generated based on RFID signals received at the first antenna 14 from the second antenna 16, since both the first antenna frequency 32 and the second antenna frequency 28 are equivalent.

In some examples, the first antenna 14 may not operate at different communication frequencies based on tension level changes of the belt 18 and the tension sensor 36 measures tension across the belt 18 so that communications may be transmitted between the first antenna 14 and the second antenna 16 based on the measured tension. In these examples, wireless communications may only be transmitted from the first antenna 14 to the second antenna 16 when the tension sensor 36 detects greater than a threshold tension across the belt 18. The sensor 36 may provide a more accurate measurement of tension experienced by the belt 18. The system 12 may further include, but is not limited to, a humidity sensor 108 and a temperature sensor 106.

Based on receiving a wireless communication from the first antenna 14 at the second antenna 16 that is indicative of the belt 18 being adjusted to the secured state, the system 12 generates an alert or feedback signal 38. For example, when the first antenna 14 and the second antenna 16 are operating at the same frequency and thus transmit wireless communications to one another, the system 12 determines that the belt 18 is at the threshold tension. The wireless communication may include information from other sensors in communication with the first antenna 14. The alert 38 may include a visual alert such as an illuminated icon or message displayed at a display screen, an audible alert or tone, a haptic alert, and the like. For example, when the system 12 is installed at the vehicle 10, and the system 12 is used to measure the tension of the belt 18, the system 12 may not be active until the vehicle 10 determines that a buckle 39 of the belt 18 is inserted into a buckle receptacle or receiver 41. This prevents alerting the user that the belt 18 is unsecured if the belt 18 is not being used at all. When the vehicle 10 recognizes that the belt 18 is being used based on determining that the buckle 39 is inserted into the buckle receptacle 41, the system 12 will be activated, such as to begin transmitting wireless communications from the second antenna 16 to receive a return wireless communication from the first antenna 14. Alerts 38 may be provided at a gauge cluster 40 of the vehicle 10 when the first antenna frequency 32 is not equivalent to the second antenna frequency 28. That is, because the system 12 is transmitting communications from the second antenna 16 and not receiving return communications from the first antenna 14, the system 12 determines that the belt 18 is in the unsecured state 24 and not providing the proper level of tension. The alert 38 may appear, for example, as a symbol on the cluster 40 that indicates the belt 18 is not sufficiently tightened, combined with audible and haptic alerts. When the first antenna frequency 32 is equivalent to the second antenna frequency 28, the system 12 recognizes the belt 18 is in the secured state 26 and sufficiently tightened because the first antenna 14 is communicating with the second antenna 16. In this case, the alert 38 may appear, for examples, as a symbol on the cluster 40 that indicates the belt 18 is sufficiently tightened. The alert may be generated by a controller/processor associated with the system 12 and/or the vehicle 10 such as the ECU 13.

When multiple belts 18 are used within a single system, such as when cargo is secured via multiple belts 18 on a truck, the system 12 may determine tension at individual belts 18. If only one belt out of the multiple belts used to secure the cargo is in the unsecured state 24, the user needs to be able to determine which specific belt is in the unsecured state. To resolve this issue, the sensor 36 included on the first antenna 14 will be uniquely identified by the system 12. Each sensor 36 may comprise a chip or piece of data incorporated into the sensor 36 that allows the system to distinguish between the multiple sensors 36, thus being able to distinguish between the multiple first antennas 14. If one belt 18 is in the unsecured state 24, the system 12 will be able to identify which specific belt 18 is in the unsecured state 24 and provide that alert 38 to the user, allowing the user to quickly identify the belt 18 that requires an increase in tension to be properly secured.

Figure 6:
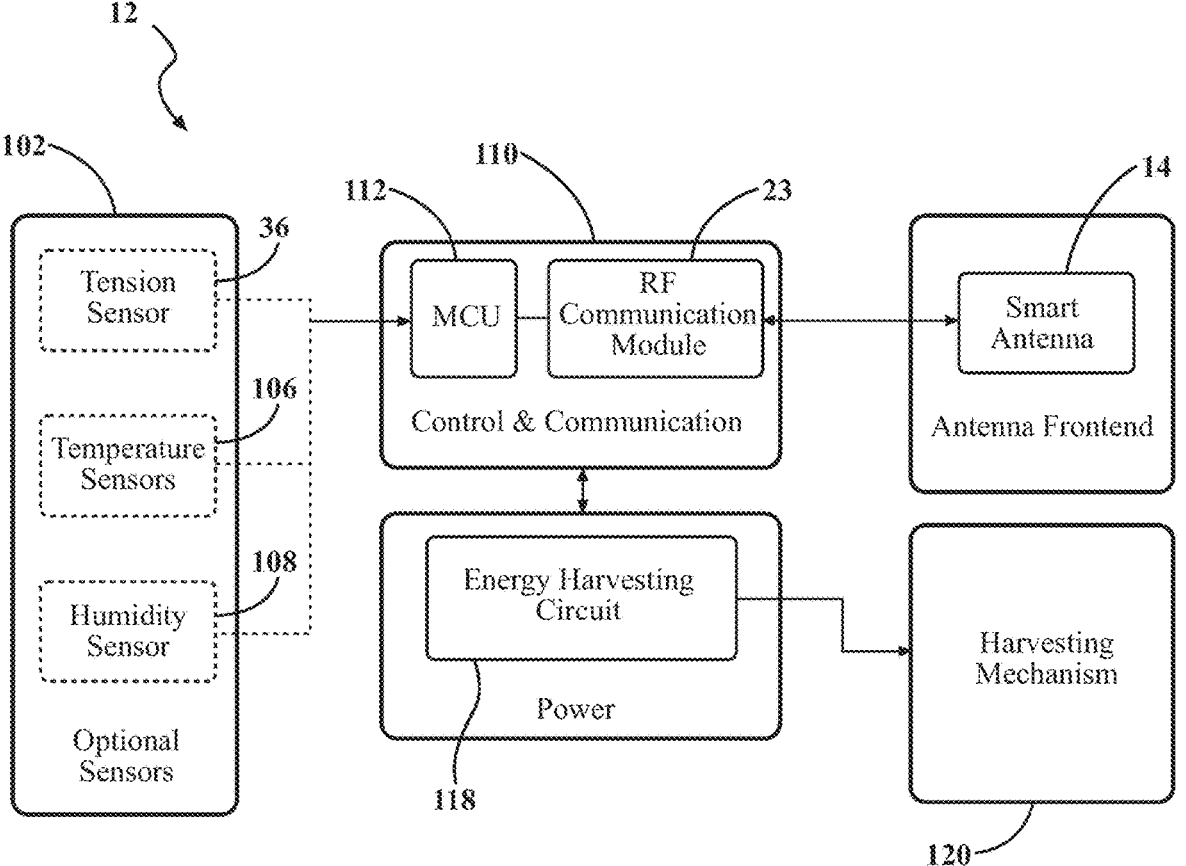
FIG. 6 is a schematic view of the belt-tightness verification system.

With reference now to FIG. 6, a schematic diagram shows the system 12 and how each element within the system 12 operates and connects with one another. Optional sensors 102 may be included in the first antenna 14, and these sensors may include the tension sensor 36, a temperature sensor 106, and a humidity sensor 108. These sensors are incorporated with a control and communication 110 of the first antenna 14, which includes a microcontroller 112 and the wireless communication 23. The control and communication 110 connect to the first antenna 14, which provides a means of communication within the system 12. The control and communication 110 receives power from an energy harvesting circuit 118 which is directly connected to the energy harvesting mechanism 120 that facilitates the reception of power from the energy harvesting circuit 118 to the control and communication 110 of the first antenna 14.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A system comprising:
a belt that is adjustable between:
a secured state wherein the secured state indicates that there is at least a threshold level of tension across the belt; and
an unsecured state wherein the unsecured state indicates that there is less than the threshold level of tension across the belt;
a first antenna disposed at the belt and operable to transmit and receive wireless communications, the first antenna operable at a resonant frequency with the belt in the secured state and inoperable at the resonant frequency with the belt in the unsecured state;
a second antenna disposed remote from the belt, the second antenna operable to transmit and receive wireless communications at the resonant frequency; and
a processor configured to generate an alert based on receiving a wireless communication from the first antenna at the second antenna, the wireless communication transmitted from the first antenna at the resonant frequency and indicative of the belt being adjusted to the secured state.

2. The system of claim 1, wherein the first antenna comprises a meander dipole antenna.

3. The system of claim 2, wherein, as the belt is adjusted from the unsecured state to the secured state, the meander dipole antenna stretches to become operable at the resonant frequency.

4. The system of claim 1, further comprising an energy harvester disposed at the belt, the energy harvester generating electrical power based on wireless communications received at the first antenna at the resonant frequency, and the generated electrical power electrically powering transmission of the wireless communications from the first antenna.

5. The system of claim 4, wherein the generated electrical power electrically powers a sensor disposed at the belt.

6. The system of claim 5, wherein the sensor comprises a tension sensor that generates sensor data representative of tension across the belt.

7. The system of claim 1, further comprising a power source disposed at the belt, the power source electrically powering the first antenna.

8. The system of claim 1, wherein the belt comprises a seatbelt of a vehicle.

9. The system of claim 8, wherein a power source of the vehicle electrically powers the first antenna.

10. The system of claim 1, wherein the generated alert comprises at least one of the group consisting of (i) an audible alert, (ii) a visual alert, and (iii) a haptic alert.

11. A verification system comprising:
a belt including a buckle, the belt adjustable between:
a secured state where the buckle is received by a receiver and wherein the secured state indicates that there is at least a threshold level of tension across the belt, and
an unsecured state wherein the unsecured state indicates that there is less than the threshold level of tension across the belt;
a first antenna disposed at the belt and operable to transmit and receive wireless communications, the first antenna operable at a resonant frequency with the belt in the secured state and inoperable at the resonant frequency with the belt in the unsecured state;
a second antenna disposed remote from the belt, the second antenna operable to transmit and receive wireless communications at the resonant frequency; and
a processor configured to generate an alert based on receiving a wireless communication from the first antenna at the second antenna, the wireless communication transmitted from the first antenna at the resonant frequency and indicative of the belt being adjusted to the secured state.

12. The verification system of claim 11, wherein the first antenna comprises a meander dipole antenna.

13. The verification system of claim 12, wherein, as the belt is adjusted from the unsecured state to the secured state, the meander dipole antenna stretches to become operable at the resonant frequency.

14. The verification system of claim 11, further comprising an energy harvester disposed at the belt, the energy harvester generating electrical power based on wireless communications received at the first antenna at the resonant frequency, and the generated electrical power electrically powering transmission of the wireless communications from the first antenna.

15. The verification system of claim 11, further comprising a power source disposed at the belt, the power source electrically powering the first antenna.

16. The verification system of claim 11, wherein the generated alert comprises at least one of the group consisting of (i) an audible alert, (ii) a visual alert, and (iii) a haptic alert.

17. A vehicle comprising:
a belt including a buckle, the belt adjustable between:
a secured state where the buckle is received by a receiver and wherein the secured state indicates that there is at least a threshold level of tension across the belt; and
an unsecured state wherein the unsecured state indicates that there is less than the threshold level of tension across the belt;
a first antenna disposed at the belt and operable to transmit and receive wireless communications, the first antenna operable at a resonant frequency with the belt in the secured state and inoperable at the resonant frequency with the belt in the unsecured state;
a second antenna disposed remote from the belt, the second antenna operable to transmit and receive wireless communications at the resonant frequency; and
a processor configured to generate an alert based on receiving a wireless communication from the first antenna at the second antenna, the wireless communication transmitted from the first antenna at the resonant frequency and indicative of the belt being adjusted to the secured state.

18. The vehicle of claim 17, wherein the first antenna comprises a meander dipole antenna.

19. The vehicle of claim 18, wherein, as the belt is adjusted from the unsecured state to the secured state, the meander dipole antenna stretches to become operable at the resonant frequency.

20. The vehicle of claim 17, further comprising an energy harvester disposed at the belt, the energy harvester generating electrical power based on wireless communications received at the first antenna at the resonant frequency, and the generated electrical power electrically powering transmission of the wireless communications from the first antenna.

\* \* \* \* \*